Oct. 15, 1968 R. C. ROSE 3,406,331
COMPENSATING POWER SUPPLY CIRCUIT FOR NON-LINEAR
RESISTANCE BRIDGES
Filed March 23, 1966
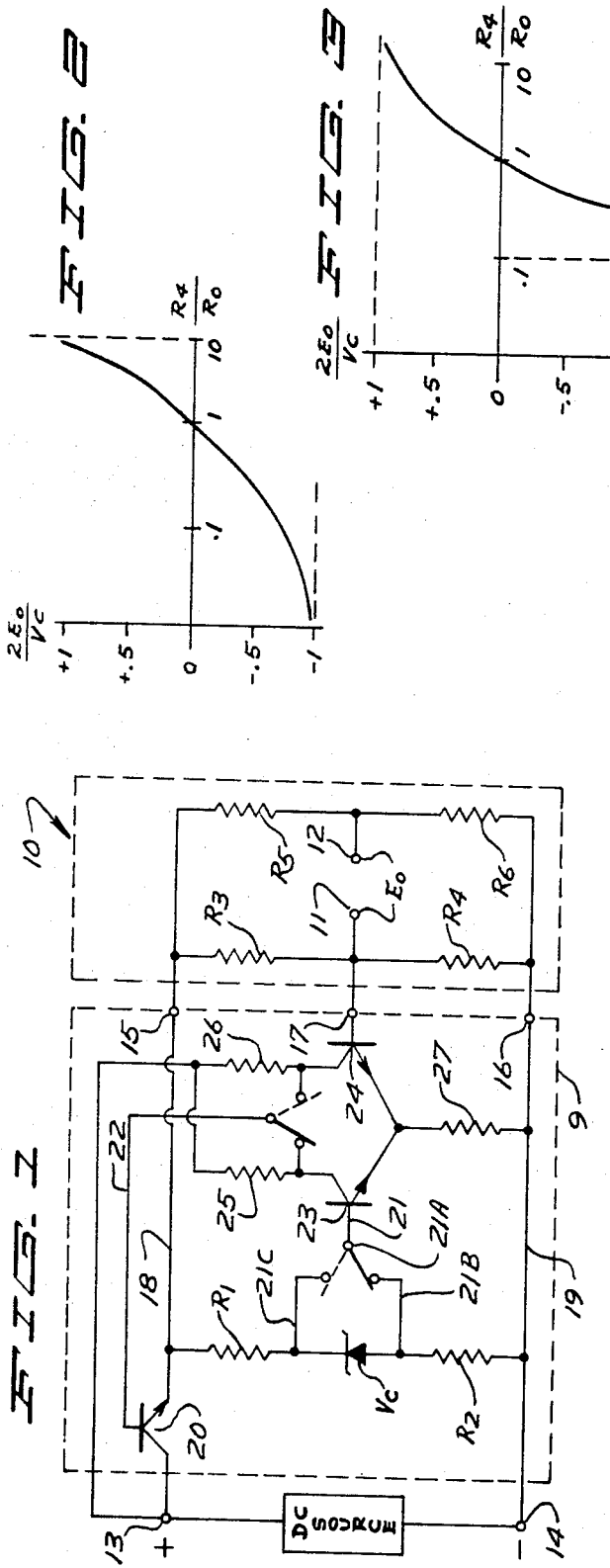
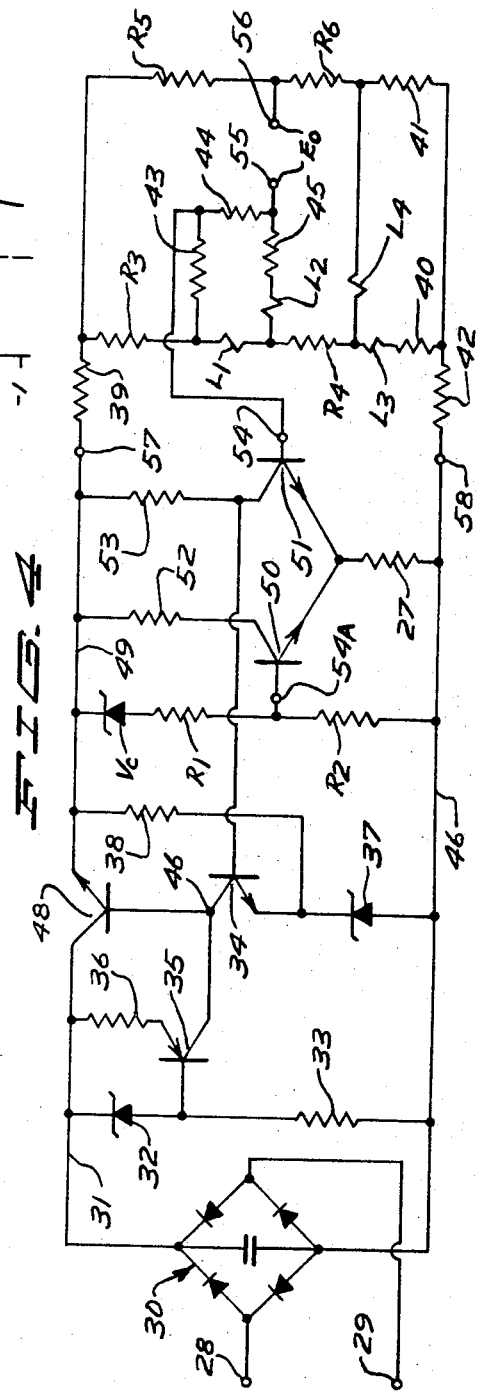
INVENTOR.
ROBERT C. ROSE
BY
Dugger Johnson + Westman
ATTORNEYS

United States Patent Office 3,406,331
Patented Oct. 15, 1968

3,406,331
COMPENSATING POWER SUPPLY CIRCUIT FOR NON-LINEAR RESISTANCE BRIDGES
Robert C. Rose, Minneapolis, Minn., assignor to Rosemount Engineering Company, Minneapolis, Minn., a corporation of Minnesota
Filed Mar. 23, 1966, Ser. No. 536,737
11 Claims. (Cl. 323—22)

ABSTRACT OF THE DISCLOSURE

A power supply circuit including voltage regulating means supplying an excitation voltage to a resistance bridge wherein one arm of the bridge varies in resistance in relation to a measurand in a non-linear manner. The means regulating the output from the power supply is sensitive to voltage differential between two control signal input terminals. The control signal input terminals are connected respectively to an output terminal of the bridge and to a series combination of a voltage reference element and two resistors connected across the output of the regulating means. The voltage control signal is sensed between one of the resistors and the subcombination of the voltage reference element and the other resistor. By proper selection of the resistances in the series combination of the two resistors and the voltage reference element the desired compensation of the output of the power supply in order to give linearity to the output of the measuring bridge can be obtained.

---

This invention relates to excitation circuitry for resistive devices and more specifically relates to controlled voltage excitation circuitry which provides a linearizing function for resistance bridges having one or more active arms.

Resistance bridges are commonly used in temperature measurment instruments wherein one of the bridge arms consists of a platinum resistance thermometer. Metals other than platinum are often used and elemental semiconductors or semiconducting devices such as thermistors are also frequently used in resistance bridges for temperature sensing. Resistive strain gages for metal or semiconductor materials are also commonly used in a bridge configuration for developing an electrical signal proportional to strain. Photoresistive devices may be used in a similar manner for light intensity measurements and moisture sensitive resistors may be used for humidistats as further examples. It is highly desirable for all these instruments that the electrical output be a linear function of the measurand. The term "measurand" refers to the condition or physical property being measured, which may be temperature, strain, humidity or other property which can be detected with a resistive device.

Non-linearities between bridge output voltage and the measurand arise through a nonlinear relation between the measurand and the resistive device. A resistance bridge is not perfectly linear either in regard to the relation between resistance change in one arm and resulting voltage output. In certain instances the bridge nonlinearity may be used to offset the resistance nonlinearity, however, this is seldom possible to the degree desired and is not often possible at all as in the case of platinum resistance thermometry where (at all but very low temperatures) the platinum nonlinearity and bridge nonlinearity is of the same sign.

In general, linearity of the output signal from an increasing resistance having an increasing sensitivity in response to the measurand may be improved simply by loading the function with a passive circuit consisting of fixed values of resistance. However, where sensitivity of the increasing resistances is of a decreasing nature, an active circuit must be employed. Active circuits may be used to give greater control for the linearizing function for the former case also.

Such passive and active techniques are known in the art and various linearizing circuits have been devised, however, they generally suffer from complexity and degree of linearization available.

As described below, one embodiment of this invention provides linearity control over a wide operating range by employing an amplifier having a differential input and single ended output to supply the bridge excitation voltage in accordance with an input from the bridge and an input from a series combination of resistors and voltage reference element coupled across the bridge input terminals.

It is therefore an object of this invention to provide an improved linearizing circuit for variable resistance sensors.

It is a further object to provide a linearizing circuit which is suitable for either increasing or decreasing sensitivity functions.

It is a further object to provide a linearizing circuit which requires a minimum number of components and yet allows a high degree of linearity control.

It is a further object to provide a linearizing circuit which functions also to compensate for changes of the lead wire resistance associated with the sensing resistance.

It is a further object to provide a linearizing power supply which is insensitive to excitation voltage changes.

Other objects will become apparent as the description proceeds.

In the drawings,

FIG. 1 is a schematic diagram which illustrates the basic circuit which can be used, through proper connections for either sign of nonlinearity correction;

FIG. 2 is a graphical presentation showing the nonlinear correcting function for a particular set of conditions;

FIG. 3 is a graphical presentation showing the nonlinear correction function of a second set of conditions; and FIG. 4 is a specific embodiment used with widely varying power sources and which serves to illustrate lead wire compensation in addition to linearization for a four lead wire resistance.

Referring to the drawings and the numerals of reference thereon, FIG. 1 shows a resistance bridge designated generally at 10 having at least one arm responsive to a measurand. "Measurand" refers to the condition or physical property being measured which may be temperature, strain, humidity or other property. The bridge as shown comprises the parallel combination of resistor $R_3$ in series with resistor $R_4$ and resistor $R_5$ in series with resistor $R_6$. A current input line 18 connects to a first amplifier output terminal 15 between resistors $R_3$ and $R_5$ and a current return line 19 connects to a second amplifier output terminal 16 between resistors $R_4$ and $R_6$. Thus, resistors $R_3$ and $R_6$ are opposite bridge arms and resistors $R_4$ and $R_5$ are also opposite arms of the bridge. A first bridge voltage output terminal 11 is connected between resistors $R_3$ and $R_4$ and a second bridge voltage output terminal 12 is connected between resistors $R_5$ and $R_6$. The voltage output is designated as $E_0$. In many instances bridges also employ series input resistors and load resistors. Such resistors are not shown in FIG. 1 but can be added to the bridge network 10, which may take on various forms but basically comprises the four resistors shown. Current input line 18 carries the output of a differential amplifier comprising the components outlined by dashed line 9 and connects to the emiter of series control transistor 20. The collector of transistor 20 is connected to a positive power input terminal 13. Line 19 connects terminal 16 to a negative power input terminal 14. In operation a DC power supply such as a battery is connected across power terminals 13 and 14 and a voltmeter is connected across bridge output terminals 11 and 12. Resistor $R_1$ is connected between the 18 and the anode of a Zener diode $V_c$. The symbol $V_c$ designates a source of reference voltage having a voltage level of $V_c$ volts. Resistor $R_2$ is connected between the cathode of $V_c$ and line 19. A transistor 23 is connected for collector to emitter conduction from power input terminal 13 through a collector resistor 25 and connects to line 19 through an emitter resistor 27. A transistor 24 is similarly connected for conduction from input terminal 13 via a collector resistor 26 and the emitter is connected to the emitter of transistor 23.

A line 21 is connected to the base of transistor 23 and a signal input terminal 21A is connected to the line 21. The signal input terminal 21A and thus the line 21 may be selectively connected to either the anode or cathode of Zener diode $V_c$. A line 22 is connected to the base of transistor 20 and then is selectively electrically connected to the collector of transistor 23 or the collector of transistor 24. As shown in solid lines, when the linearizing connection is positive, or in other words an increased output is desired, the line 22 is connected to the collector of transistor 23 and line 21 is connected to line 21B. When the linearizing connection is negative, line 22 is connected to the collector of transistor 24 and line 21 is connected to line 21C, as shown in dotted lines. The base of transistor 24 is connected to an amplifier signal input terminal 17 which in turn is electrically connected to bridge output terminal 11.

The bridge output voltage signal $E_0$ at terminals 11 and 12 is related to the resistance values of the bridge resistors and the excitation voltage across terminals 15 and 16 (which will be termed $E_b$) by the bridge equation:

$$(1) \quad E_0 = \frac{E_b(R_4R_5 - R_3R_6)}{(R_3+R_4)(R_5+R_6)}$$

This equation shows that there is a nonlinear relation between changes in resistance of any bridge resistor and the bridge output voltage for a constant value of bridge input voltage. Also, the bridge resistor (or resistors) which responds to the measurand almost always exhibits a nonlinear function between resistance and measurand value (for example, resistance vs. temperature or resistance vs. strain). This also must be considered when relating output voltage $E_0$ to the measurand.

In the circuit of FIG. 1, however, the bridge input voltage $E_b$ is made a function of resistors $R_1$, $R_2$, $R_3$, $R_4$ and the voltage reference source $V_c$ because the amplifier output is responsive to a differential in signal between signal input terminals 17 and 21. A signal differential between these terminals occurs when the bridge becomes unbalanced because of a change in resistance of one or more arms due to a change in the measurand. The output of the bridge is proportional to the input voltage which in turn is determined by the differential input signal to the amplifier. Therefore, by proper selection of resistance values the bridge excitation voltage is automatically controlled to give a linear relation between changes in $E_0$ and changes in the measurand. This automatic compensatory control may be understood by analyzing the action of transistors 20, 23 and 24 in response to a voltage change at input terminal 17 (which is the same as the change at terminal 11). Assume that the voltage at terminals 17 and 11 increases due to an increasing $R_4$ ($R_4$ is the measurand sensing resistance). Transistor 24 then is biased to conduct more heavily giving a positive signal at its emitter and a negative signal at its collector. This also causes a positive signal at the emitter and collector of transistor 23. When the base of transistor 20 is connected to the collector of transistor 21 as shown in FIG. 1, this positive signal biases the transistor to cause more current to flow through transistor 20 thereby raising the voltage on line 18 and at the output terminal 15 and giving a proportional voltage increase at terminal 11, due to increased current flow through resistors $R_3$ and $R_4$. This increased voltage level on line 18 also gives an increased current flow through resistor $R_1$, Zener diode $V_c$ and resistor $R_2$ thereby affecting the base voltage of transistor 23. When the base of transistor 23 is connected to line 21B and thus to the cathode of diode $V_c$ as shown in FIG. 1, this increased current through resistor $R_2$ gives a positive voltage signal on the base of transistor 23 which biases the transistor to conduct from its collector to its emitter. This tends to limit the positive collector signal at transistor 23 which was derived from transistor 24 and thus from the signal at terminals 17 and 11. With proper selection of resistors and transistors to insure that the transistor are operating well within their design limits, the circuit then functions to maintain equal voltages at the bases of transistors 23 and 24 and thus at terminals 17 and 21. The combination of transistors 20, 23 and 24 function then as a differential amplifier which gives an output voltage to line 18 such that the differential in signal at the amplifier input terminals is substantially zero. When the cathode voltage at Zener diode $V_c$ is equal to the voltage at terminals 11 and 17 ($E_0$) it is readily seen that $$(2) \quad E_b = V_c \frac{R_3 + R_4}{R_3 - \frac{R_1 R_4}{R_2}}$$

and it follows that $$(3) \quad E_0 = \frac{V_c(R_4R_5 - R_3R_6)}{\left(R_3 - \frac{R_1}{R_2}R_4\right)(R_5 + R_6)}$$

by substitution into expression (1) given above.

By way of example, the circuit of FIG. 1 functioned satisfactorily as described above when $R_4$ was a simulated platinum resistance thermometer operating from 75° C. to 300° C. and having a resistance of 100 ohms at 0° C. Resistance $R_1$ and $R_2$ were 51 ohms and 400 ohms respectively and $R_3$ and $R_5$ were each 333 ohms. Resistor $R_6$ was 100 ohms. Transistors 23 and 24 were type 2N3565, transistor 20 was type SE7005 and $V_c$ was a 6.4 volt Zener diode type IN827. Resistors 25 and 26 were 6800 ohms and resistors 27 was 700 ohms. An excitation voltage of 30 volts DC was applied to terminals 13 and 14. Since platinum exhibits a decreasing sensitivity (percent change in resistance per degree Celsius) over the subject temperature range, the term $(R_3 - R_4R_1/R_2)$ in the denominator of expression (3) was just adequate to substantially compensate for the overall decreasing sensitivity and results in $E_0$ being linearly related to temperature. The nonlinearity amounted to less than ±.15° C. for this example across the operating range of the thermometer. An important feature of this invention is that the ratio $R_1/R_2$ may be selected to give linearity control over a wide range once the resistance bridge values are known and the nonlinear relation between sensing resistance and the measurand is known.

FIG. 2 graphically illustrates the nonlinear contribution of the circuits described above for the particular case when $R_3$, $R_5$ and $R_6$ are all equal to $R_0$ where $R_0$ is the resistance of $R_4$ (the measurand sensitive resistance) at a convenient reference point. The curve shown is for $R_1/R_2 = .1$ and it may be seen from expression (3) that larger values for $R_1/R_2$ would give greater nonlinearity and if $R_1/R_2$ was zero there would be no circuitry nonlinear contribution between output voltage and $R_4$. It may be observed that the curve is asymtotic to $R_4/R_0 = 10$ and $2E_0/V_c = -1$. These values are shown by dashed lines in FIG. 2.

If the relation between resistor $R_4$ and the measurand was such that the sensitivity increased with increasing measurand value the alternate switching combination of FIG. 1 would be used to give a linear relation between output voltage $E_0$ and measurand. Examples of such a relation are the use of a nickel temperature sensing resistor or an N-type silicon piezoresistive element under compression. This alternate switching combination (shown in dotted lines in FIG. 1) requires that the base of transistor 20 (line 22) be connected to the collector of transistor 24 and the base of transistor 23 be connected to the anode of Zener diode $V_c$ (line 21 connected to line 21C). The circuit operation is similar to that described above and the same type of analysis shows that (4) $$E_0 = \frac{V_c(R_4R_5 - R_3R_6)}{\left(R_4 - \frac{R_2}{R_1}R_3\right)(R_5 + R_6)}$$

for this case. It will be noted by comparison to expression (3) that the same parameters $(R_1/R_2)$ are effective in giving the nonlinear compensation effect only now the sign of the correction is different. This is illustrated graphically in FIG. 3 which shows the relation between output voltage $E_0$ and $R_4$ where $R_3$, $R_5$, $R_6$ and $R_0$ are all equal and for $R_1/R_2 = 10$. A smaller value of $R_1/R_2$ would give less nonlinearity and a value of zero would tend to a limit of zero nonlinearity. It may be seen that this curve is asymtotic to $2E_0/V_c = +1$ and to $R_4/R_0 = .1$. Thees values are shown by the dashed lines in FIG. 3.

The exmaples given above are directed to the cases where $R_4$ is the resistor responsive to be measurand. However it is obvious that $R_3$ could be used rather than $R_4$ or that two or more of the bridge arms can be made responsive to the measurand and the circuit can be used for linearizing substantially in the manner described.

In the event that the bridge is modified by addition of input load resistance and/or a finite load resistance, the bridge equation given in expression (1) would be modified to include such resistances and such modifications would appear as additional terms in either expression (3) or expression (4) depending upon which sign of correction was desired. Expression (3) and (4) may be considered to be the basic equations for this linearization technique and the addition of various loading resistors to the basic four arm bridge of FIGURE 1 would result in more complicated expressions in place of Equations 3 and 4 but the function would still be controlled predominantly by the expressions shown.

The signal applied to bridge would be controlled by the output of an amplifier whose output in turn was sensitive to a differential in signal between two input terminals. The signal to one input terminal would be supplied by the output of the measuring bridge and the signal to the other input terminal would be supplied from a reference voltage which changed with changes in amplifier output voltage.

FIG. 4 shows a specific embodiment designated for use with a platinum resistance thermometer where lead wire compensation was required in addition to linearizing and the input power terminals had to accept either AC or DC power. It was found that the circuit of FIG. 4 functioned so that resistance changes in the platinum thermometer leads gave only a negligible signal at the bridge output terminals. The errors measured were an order of magnitude lower than the errors present without the compensating effect of the amplifier and reference voltage element. The circuit of FIG. 4 is similar to FIG. 1 except as noted below.

In FIG. 4 a diode bridge of known characteristics designated generally at 30 comprises four diodes and a filter capacitor and serves to provide a DC voltage between lines 31 and 46 when either DC or AC power is applied to the diode bridge through input terminals 28 and 29. Output current from the diode bridge 30 is supplied through line 31 to the remainder of the circuit and current is returned through line 46. Zener diode 32 has its anode connected to line 31 and cathode connected through resistor 33 to line 46. The cathode of diode 32 is also connected to the base of transistor 35. The emitter of transistor 35 connects through resistor 36 to line 31 and the collector connects to junction 46. Line 31 connects to the collector of transistor 48 and the emitter is connected to line 49. The base of transistor 48 connects to junction 46. Transistor 34 has its collector connected to junction 46 and its emitter connected to the anode of Zener diode 37. The anode of 37 also connects through resistor 38 to line 49 and the cathode is connected to line 46. The series combination of Zener diode $V_c$, resistor $R_1$ and resistor $R_2$ is connected between lines 49 and 46 similiar to FIG. 1. Transistors 50 and 51 have their collectors connected through resistors 52 and 53 respectively to line 49. Their emitters are connected together for conduction through resistors 27 to line 46. The base of transistor 50 connects between resistor $R_2$ and the series combination of resistor $R_1$ and Zener diode $V_c$. The base of transistor 51 connects to terminal 54. Line 49 connects to terminal 57 and line 46 connects to terminal 58. These terminals, 57 and 58 are the output terminals of the amplifier and supply the bridge excitation voltage. The collector of transistor 51 is also connected to the base of transistor 34.

Zener diode 32 serves to maintain substantially constant voltage at the base of transistor 35. The collector current from transistor 35 divides at junction 46 leading to the base of transistor 48 and the collector of transistor 34. It was found that the voltage regulation on line 49 was very sensitive to the current input at junction 46 from transistor 35 and the specific current source shown comprising transistor 35, diode 32 and resistors 33 and 36 is a known means of maintaining substantially constant current to junction 46 in the presence of input voltage variation. This means that if the input voltage varies, the voltage on line 49 will stay relatively stable. Zener diode 37 maintains a fixed voltage at the emitter of transistor 34 and resistor 38 insures that diode 37 is in its linear region of operation irrespective of low current flow from transistor 34.

The amplifier of FIG. 4 operates in much the same manner as that shown in FIG. 1. The output of the amplifier is changed by an initial differential in signals between terminals 54 and 54A. The output is automatically adjusted until the differential at these terminals reaches zero.

A positive input signal at signal input terminal 54 biases the transistor 51 to produce a negative signal at the collector of transistor 51 and thereby at the base of transistor 34. This reduces conduction through transistor 34 and the resulting decreased current through transistor 34 results in a positive signal at the base of transistor 48 (more current from junction 46 flows to the base of transistor 48) thereby giving an increased potential on line 49. This increased potential causes current to flow through the $V_c$-$R_1$-$R_2$ combination and causes the voltage to rise in a limiting manner at a signal input terminal 54 and thus at the base of transistor 50. This causes conduction through the emitter of transistor 50 which opposes the emitter of transistor 51. This occurs until the potential at terminal 54A is substantially equal to the input signal at terminal 54. The output of the amplifier to the bridge stabilizes when the potentials at terminals 54 and 54A are the same.

The bridge circuit of FIG. 4 differs from FIG. 1 in that series resistor 39 is connected between terminal 52 and the junction of resistors $R_3$ and $R_5$. Also, resistor $R_4$ (the platinum resistance thermometer for this specific description) is shown as a four lead element having leads $L_1$ and $L_2$ at one end. $L_1$ connects to $R_3$ and $L_2$ connects through resistor 45 to output terminal 55. Leads $L_3$ and $L_4$ are at the other end of the element. Lead $L_4$ connects to $R_6$ and the series combination $L_3$, resistor 40 and resistor 41 is connected in parallel with $L_4$. The junction of resistors 40 and 41 connects through bridge series resistor 42 to terminal 53 on line 46. Also, the series combination of resistors 43, 44 and 45 is connected across the terminal points of leads $L_1$ and $L_2$, and the junction of resistors 43 and 44 is connected to terminal 54 which in turn connects to the base of transistor 51. Output terminal 55 connects to the junction of resistors 44 and 45. The primary distinction from FIG. 1 is the manner in which compensation for lead wire changes is effected. It is known that (without employing the amplifier circuitry) shunting lead wire resistances as shown in FIG. 4 can give a bridge condition such that uniform increases in lead resistances has little effect on the bridge output voltage for one particular value of $R_4$, however, objectionable errors are present as $R_4$ varies over a wide temperature range. As $R_4$ increases the error due to increases in the lead resistances causes the bridge output voltage to decrease.

It has been found as part of this invention that by taking one amplifier input signal from between resistors 43 and 44 of the potential dividing network (consisting of the series combination of resistors 43, 44, 45 and $L_2$, all across $L_1$) the bridge output voltage is substantially independent of uniform lead wire changes of relatively large magnitude and over a wide variation of $R_4$. In this case the bridge excitation is raised by an amount increasing in proportion to $R_4$ for a given increase in lead resistances so that lead wire compensation is achieved over a wide temperature range. The optimum values of resistors 43, 44 and 45 may be determined by experimentation or by analytical methods. It has also been noted that these optimum values are dependent on the value of bridge load resistance which might be applied across terminals 55 and 56 but once a load resistance value has been selected, the optimum values for resistors 43, 44 and 45 may be made. The bridge output terminal 55 is connected between resistors 44 and 45. This arrangement for balancing the lead wires for platinum thermometers is known. However, the connection of the differential amplifier input so as to be insensitive to lead wire changes was not known. In an experimental circuit resistors 39 and 42 were 363 ohms, resistor 40 was 623 ohms, resistor 41 was 580 ohms, $R_6$ was 100 ohms, $R_3$ and $R_5$ were each 2400 ohms, resistor 43 was 5277 ohms, resistor 44 was 4747 ohms and resistor 45 was zero. Resistor $R_4$ simulated a platinum temperature sensor which was approximately 100 ohms at 0° C. and bridge readings were taken at various simulated temperatures between −200° C. and +500° C. Lead wire resistances were varied between 0 and 10 ohms for each set of measurements. The supply voltage at terminals 28 and 29 was 25 volts DC. The diode bridge 30 consisted of four type SD2 diodes and a 47 $\mu f$. capacitor. Diodes 32 and 37 were 4.7 volt type 1N705. Diode $V_c$ was a 6.4 volt type 1N827. Transistors 50, 51 and 34 were type 2N3565, transistor 35 was a 2N3638 and transistor 48 was type SE7005. The following resistors completes the list of component values: 33, 3300 ohms; 36, 1000 ohms; 38, 1800 ohms; 52, 4100 ohms; 53, 8200 ohms; 27, 1200 ohms; $R_1$, 374 ohms; and $R_2$, 387 ohms. Test results showed that the maximum error due to uniform lead wire variations between 0 and 10 ohms was less than 0.1° C. over the temperature range of −200° C. to +500° C. The error due to nonlinearity between output voltage and temperature was less than ±0.4° C. for these same measurements. It was also found that changing the supply voltage at terminals 28 and 29 over the range of 18 volts DC to 36 volts DC gave only a negligible effect on the bridge output voltage at terminals 55 and 56. It is apparent from the foregoing description that the circuitry of FIG. 4 gives a temperature measuring system of superior accuracy and suitable for general application to temperature measurement.

Many widely different embodiments of this invention may be made without departing from the scope thereof, and it is to be understood that this invention is not limited to the specific embodiments disclosed herein.

What is claimed is:

1. A linearizing power supply comprising regulating means delivering an output responsive to an input control signal having first and second output terminals for energizing a resistive bridge and first and second signal input terminals, said bridge having parallel branches with at least one active arm and adjacent arm in one of said branches; first and second power terminals for energizing said regulating means; a series combination of a first resistor, a voltage reference element and a second resistor connected between said first and second output terminals; said first signal input terminal being coupled to a first junction between said first resistor and the subcombination of said voltage reference element and said second resistor; and said second input terminal being coupled to a second junction between said active and adjacent arms of said bridge whereby said regulating means functions to maintain zero voltage difference between said first and second junctions.

2. The combination of claim 1 wherein said regulating means comprises first, second and third transistors, said first and second transistors having the bases thereof coupled to said first and said second input terminals respectively, said first and second transistors being connected for conduction between said first and second power terminals, said third transistor having its conductance controlled by said first and second transistors and being connected for conduction between said first power terminal and said first output terminal.

3. The combination of claim 1 wherein said voltage reference element comprises a Zener diode.

4. A linearized resistance measuring circuit comprising first, second and third resistive branches each branch having at least two arms in series and all of said branches connected for conduction from a first power input terminal to a second power input terminal; said first branch having a constant voltage element in series with its arms and a third terminal between its arms; said second branch having at least one active arm responsive to a measurand, fourth and fifth terminals between the arms in said second branch, said third branch having a sixth terminal between its arms, said fifth terminal and said sixth terminal being adapted for connection to output voltage measuring means, differential input single stage output voltage regulating means having a pair of signal input terminals coupled to said third terminal and said fourth terminal, and said regulating means having output terminals coupled to said first and second power input terminals, said regulating means including means to vary its output until the differential in signal between the regulating means input terminals is substantially zero.

5. The combination of claim 4 wherein said active arm comprises a resistor having a pair of leads at each end, a potential dividing circuit connected in parallel with one of said leads, and said fourth and fifth terminals of said second branch being on said potential dividing circuit.

6. The combination of claim 5 wherein said fourth and fifth terminals of said second branch are separated by a resistor.

7. The combination of claim 4 wherein said second and third branches each comprise two active arms responsive to a measurand, said arms being connected so that adjacent arms are responsive in opposite sense and opposed arms are responsive in like sense.

8. The combination of claim 4 wherein said constant voltage element is in an arm oppositely disposed in respect to said active arm and the measured voltage between said fifth terminal of said second branch and said sixth terminal of said third branch responds basically according to the formula $$E_0 = \frac{V_c(R_4R_5 - R_3R_6)}{\left(R_3 - \frac{R_1}{R_2}R_4\right)(R_5 + R_6)}$$

where $E_0$ is the measured voltage, $V_c$ is the voltage of said constant voltage element, $R_4$ is the resistance of said active arm, $R_3$ is the resistance of an arm adjacent to $R_4$ in said second branch, $R_5$ is the resistance of an arm of said third branch and is in opposed relation to $R_4$, $R_6$ is the resistance of an arm of said third branch and is adjacent to $R_5$, and $R_1$ and $R_2$ are resistances in series relation in said first branch.

9. The combination of claim 4 wherein said voltage reference element is in an arm adjacently disposed in respect to said active arm and the measured voltage between said fifth terminal and said sixth terminal responds basically according to the formula $$E_0 = \frac{V_c(R_4R_5 - R_3R_6)}{\left(R_4 - \frac{R_2}{R_1}R_3\right)(R_5 + R_6)}$$

where $E_0$ is the measured voltage, $V_c$ is the voltage of said constant voltage element, $R_4$ is the resistance of said active arm, $R_3$ is the resistance of an arm adjacent to $R_4$ in said second branch, $R_5$ is the resistance of an arm of said third branch and is in opposed relation to $R_4$, $R_6$ is the resistance of an arm of said third branch and is adjacent to $R_5$, $R_1$ and $R_2$ are the resistances of the resistors in series relation in said first branch.

10. The combination of claim 8 wherein the ratio $R_1/R_2$ is selected so that the curve derived when plotting $2E_0/V_c$ versus $R_4/R_0$ (where $R_3$, $R_5$ and $R_6 = R_0$ and $R_0$ is the resistance value of $R_4$ at a reference point) is substantially the same as the inverse configuration of the uncompensated curve of $E_0$ versus measurand value.

11. A linearizing power supply comprising regulating means having first and second output terminals for energizing a resistive bridge and first and second signal input terminals for controlling the power output at said output terminals, said bridge having parallel branches with at least one active arm and adjacent arm in one of said branches; first and second power terminals for energizing said regulating means; a series combination of a first resistor, a voltage reference element and a second resistor connected between said first and second output terminals; said first signal input terminal being electrically connected to a first junction between said first resistor and the series combination of said voltage reference element and said second resistor; and said second input terminal being electrically connected to a second junction between said active and adjacent arms of said bridge, said regulating means including means sensitive to the signal at the first and second signal input terminals of the regulating means to control the output of said regulating means so as to change the output signal until the signal at the first signal input terminal substantially equals the signal at the second signal input terminal.

References Cited

UNITED STATES PATENTS

| | | | |
|---|---|---|---|
| 2,657,352 | 10/1953 | Sink | 323—75 |
| 2,801,388 | 7/1957 | Ruge | 323—69 X |
| 2,963,637 | 12/1960 | Osborn | 323—22 |
| 3,103,617 | 9/1963 | Schneider et al. | 323—22 |
| 3,126,508 | 3/1964 | Eriksson et al. | 323—69 |

MILTON O. HIRSHFIELD, *Primary Examiner.*

W. E. RAY, *Assistant Examiner.*